United States Patent
Steensma

(10) Patent No.: US 6,596,300 B1
(45) Date of Patent: Jul. 22, 2003

(54) ANIMAL FEED

(76) Inventor: Ben Steensma, 401 S. Kniss Ave., Luverne, MN (US) 56156

( * ) Notice: Subject to any disclaimer, the term of this patent is extended or adjusted under 35 U.S.C. 154(b) by 0 days.

(21) Appl. No.: 09/441,699

(22) Filed: Nov. 16, 1999

Related U.S. Application Data

(62) Division of application No. 09/110,793, filed on Jul. 6, 1998, now Pat. No. 6,019,995, which is a continuation of application No. 08/680,536, filed on Jul. 9, 1996, now abandoned.

(51) Int. Cl.[7] .................................................. A23K 1/06
(52) U.S. Cl. ......................... 424/438; 424/442; 426/2; 514/546; 514/588; 514/724; 514/770
(58) Field of Search ................................ 424/438, 442; 426/2, 69, 623, 624, 630, 635, 636, 648, 803, 807, 805, 592; 514/546, 588, 724, 770

(56) References Cited

U.S. PATENT DOCUMENTS 3,988,483 A * 10/1976 Deyoe et al. .................. 426/69
5,908,634 A * 6/1999 Kemp et al. ................. 424/442

FOREIGN PATENT DOCUMENTS

EP 076964 4/1983
EP 0202915 11/1986

OTHER PUBLICATIONS

Tech Bull—94 DNAL C100 GK4(4) #94 vol. 1 Pratt & England Oklahoma Ag. Expt. Station, Feb. 1962.*
Morrison Feeds & Feeding pp. 1120–1121, 1193, 1954.*
Milks, H.J., "Practical veterinary pharmacology, materia medica and therapeutics", Sixth Edtion,, pp. 166–171, (1949).
Morrison, F.B., "Feeds and Feeding—a handbook for the student and stockman", 21st edition, pp. 1138–1143, (1954).

* cited by examiner

*Primary Examiner*—Neil S. Levy
(74) *Attorney, Agent, or Firm*—Schwegman, Lundberg, Woessner & Kluth, P.A.

(57) ABSTRACT

The present invention includes a method for increasing meat production while reducing fat in ruminant and non-ruminant animals and for increasing egg production in poultry and milk production in ruminant animals. The method includes mixing ingredients that include 190 proof ethanol in a concentration of about 9% by weight of a food supplement with clay and a nitrogen source such as urea to form the food supplement. The food supplement for ruminant animals additionally includes a condensed distiller's soluble fraction. The mixed ingredients are added to an animal feed such as corn. The animal feed and supplement are fed to an animal at least one per day.

6 Claims, No Drawings

ANIMAL FEED

This application is a Divisional of U.S. application Ser. No. 09/110,793, filed Jul. 6, 1998 U.S. Pat. No. 6,019,995 which is a Continuation of U.S. Ser.No. 08/680,536, filed Jul. 9, 1996, now abandoned.

BACKGROUND OF INVENTION

The present invention relates to an animal feed supplement.

Animal feeds must be formulated to meet specific needs of digestive systems of particular animal groups. For instance, ruminants, such as cattle, sheep and goats have different nutritional requirements from non-ruminants because ruminants have multiple stomachs and unique microbial cultures in their digestive tracts. Ruminant feed must not upset these microbial cultures but must accommodate the animals' nutritional needs.

Protein requirements of ruminants may be typically met by feeding the animals urea, along with grain, hay and silage. Urea is broken down in the ruminants' stomachs by microbes so that nitrogen in the urea can be used to make amino acids. Urea is recycled in ruminants in the following path described in *Biochemical Adaptation* by P. W. Hochachka (1984): liver urea→blood urea→equilibration with extracellular water→salivary glands→urea in salivary glands→rumen urea. Once in the rumen, urea is hydrolyzed to bicarbonate ion and ammonium ion by the action of urease.

Urea does not typically provide more than 30% of nutrients that can be used by the ruminant to make protein. If a ruminant ingests too much urea, the animal may die because excess nitrogen is converted to ammonia which may be lethal to the animal.

Some non-ruminant animals, such as swine, are omnivores. Swine typically eat a diet that includes about 75 to 80 percent carbohydrate and about 16 percent protein. Swine typically are not fed urea. Swine have a very low tolerance for roughage. Corn is regarded as an excellent source of energy for swine but requires supplementation because corn is deficient in protein, calcium, and the amino acids, lysine and tryptophan. Swine are more sensitive to dietary deficiencies than ruminants because, unlike ruminants, swine do not have microbial cultures that synthesize required nutrients.

Poultry, which have crops and gizzards instead of stomachs, have different digestive systems and nutritional requirements than animals such as ruminants and non-ruminants such as swine. Poultry must ingest gritty materials such as oyster shells that mechanically aid each bird in digestion. Poultry, such as chickens, have a protein requirement of 16 to 20 percent of food ingested. Like swine, poultry typically do not ingest urea to make proteins. Poultry and swine, like ruminants, are susceptible to ammonia poisoning.

In addition to each animal's unique anatomy, nutritional requirements of the animals are dictated by each animal's needs with respect to meat production, milk production, egg production as well as reproduction of the animal and the animal's response to stress. Typically, the animal's feed must be specially formulated to provide the necessary carbohydrate, fat and protein in a form that can be metabolized by the animal.

The Anderson et al. patent, U.S. Pat. No. 2,808,332, issuing Oct. 1, 1957, describes a use of ethanol in feed supplements for ruminant animals. The patent describes incorporation of ethanol into formulations that also include nitrogen sources such as urea, ammonia, ammonium propionate, ammonium phosphate, as well as phosphoric acid, molasses, vitamins and trace minerals. The patentees noted that microorganisms inhabiting the digestive tract of ruminants cannot sufficiently synthesize some of the amino acids needed from urea and carbohydrate when living aerobically, lacking unoxidized hydrogen. The ethanol is added to the feed supplement in order to supply unoxidized hydrogen to the ruminant.

The Anderson et al. patent, U.S. Pat. No. 3,484,243 ('243), issuing Dec. 16, 1969, describes an animal feed for use by ruminants. The animal feed includes sugars, water-miscible alcohols such as ethyl alcohol and n-propyl alcohol, urea, and phosphoric acid.

The '243 patent describes a use of n-propyl alcohol because concentrated water-miscible alcohols, such as ethanol, have an undesirable property of denaturing protein on the animal's tongues. The patentees added n-propyl alcohol to their feed supplement in order to eliminate this adverse effect. The patentees noted that it was necessary to employ minimal concentrations of n-propyl alcohol in feeding animals initially because the cattle did not eat the supplement in adequate amounts if large quantities were added.

The Bentley et al patent, U.S. Pat. No. 4,863,959, issuing Sep. 5, 1989, describes a use of an anthranilonitrile derivative for promoting growth, improving feed efficiency, and for increasing a lean meat to fat ratio of warm blooded animals. The patent observed that anthranilonitrile derivatives tended to reduce fat and promoted growth in warm blooded animals. The patentees also noted that these materials are useful as antiasthmatic and antiobesity agents for humans. The anthranilonitrile derivatives are described as mixed directly with animal feeds or prepared in the form of animal feed premix or concentrate that could be blended with an animal feed or a top dressing.

SUMMARY OF THE INVENTION

The present invention includes a method for increasing meat production, while reducing fat in ruminant and non-ruminant animals and for increasing egg production in poultry. The method includes mixing ingredients that include 190 proof ethanol in a concentration of about 9% by weight of a food supplement with clay and a nitrogen source such as urea to form the food supplement. The feed supplement for ruminant animals additionally includes a condensed distiller's soluble fraction. The mixed ingredients are added to an animal feed such as corn. The animal feed and supplement are fed to an animal at least once per day.

The present invention also includes an animal feed supplement for use by ruminant and non-ruminant animals that includes 190 proof ethanol in a concentration of about 9% by weight of the supplement, a nitrogen source such as urea and clay.

DETAILED DESCRIPTION OF PREFERRED EMBODIMFNTS

The present invention includes a method for rapidly increasing weight of a non-ruminant animal while reducing fat in the animal and for increasing egg production in poultry that includes supplementing an animal feed with a supplemental formulation that includes 190 proof ethyl alcohol, ethyl acetate, urea, clay, molasses and water. The present invention also includes a method for increasing milk production in dairy cows that includes a further addition of a condensed distiller's soluble fraction to the feed supplement of the present invention. The feed supplement also reduces feed dust and odor in livestock buildings and pens.

The present invention also includes an animal feed supplement for use by non-ruminant and ruminant animals comprising ingredients of 190 proof ethyl alcohol, ethyl acetate, urea, phosphorus, clay and water. In one embodiment, the feed supplement also includes soybean oil in a concentration of 10% by weight and whey in a concentration of about 12% by weight of the supplement. One other embodiment of the feed supplement of the present invention that includes the condensed distiller's solubles fraction.

It has surprisingly been found that an animal supplement that includes 190 proof ethyl alcohol in a concentration of 9% by weight of the supplement and urea can be fed to non-ruminant animals such as poultry and hogs, even in the presence of whey. This result is surprising because individuals skilled in the art have previously believed that swine and poultry would die if fed a food supplement that included the concentrations of ethyl alcohol and urea described in the present invention.

It has also surprisingly been found that the feed supplement, fed with the condensed distiller's fraction, significantly boosts milk production in dairy cows. It is believed that feeding the feed supplement of the present invention that includes both an alcohol concentration and the condensed distiller's soluble concentration increases energy per pound of food consumed. Meeting a cows energy requirement without requiring the cow to consume excessive amounts of grain results in a significant weight gain per pound of food consumed as compared to cows not receiving the food supplement and cows receiving a food supplement with ethanol only. With the desirable weight gain, cows are better conditioned in terms of muscle development and have stronger estrous cycles and better conception rates. It has also been found that dairy cows receiving the food supplement of the present invention display less ketosis and less laminitis than cows not receiving the food supplement.

As discussed in the Background, non-runinant animals are not believed to be capable of utilizing significant amounts of urea without forming toxic amounts of ammonia. It has surprisingly been found, however, that the food supplement of the present invention not only does not kill non-ruminant livestock but actually enhances meat and egg production while reducing fat in these animals.

One embodiment of the food supplement of the present invention for ingestion by livestock having a single stomach such as swine and poultry is shown in Table 1. It is not understood how or why the formulation of the present invention acts to increase meat production while reducing fat in single-stomached livestock and poultry. It is believed that the feed supplement provides more energy per pound of food consumed with less fiber, thereby increasing efficiency of food metabolism in animals receiving the supplement. It is not understood how the formulation acts to increase egg production. It is believed that an interaction of clay with ethyl alcohol and urea neutralize any toxic effects from the alcohol and urea.

TABLE 1

| INGREDIENT | PERCENT CONCENTRATION RANGE |
|---|---|
| 95.2% Ethyl Alcohol denatured with 4.8% ethyl acetate | 9% by weight |
| 10% Urea-34% Phosphorous | 3.75 |
| Urea | 10.3 |
| Clay (Bentonite) | 0.5–2.5 |
| Molasses | 39.2–49.2 |
| Whey | 12.3 |
| Water | 12.95–14.95 |
| Soybean Oil | 0–10 |

The feed supplement of the present invention is preferably in a liquid form. The feed supplement may be mixed with the animals' conventional or normal ground feed. The feed supplement of the present invention may also be provided to an animal in a lick tank or blended in an animal's total mixed ration. The protein, carbohydrate and fiber in a particular animal's diet may be adjusted as needed. One pound of the feed supplement of the present invention, fed with 3½ pounds of roughage has an energy equivalent of 4 pounds of corn and the protein of one pound of soymeal.

It has been found that the formulation of the present invention is stable within a temperature range of 10° F. to 120° F.

The following examples are presented to illustrate the performance of the feed supplement of the present invention and are not intended to limit application of the feed supplement.

EXAMPLE ONE

In one swine test, the results of which are shown in Table 2, it was found that the use of the feed supplement of the present invention increased average daily weight gain of pigs as compared to a control group of pigs and produced more pounds of salable meat per pound of food consumed by each animal. The test included 22 control pigs, 23 protein control pigs fed the same quantity of protein as pigs receiving the formulation of the present invention and 22 pigs receiving the feed supplement of the present invention. The control pigs were fed a producers' normal ration, having a protein content of 16% by weight of feed. The protein control pigs were also fed a producer's normal ration with 15% protein, the same protein concentration as the pigs receiving the formulation of the present invention. Each group of pigs received identical amounts of minerals and vitamins.

TABLE 2

|  | CONTROL | PROTEIN CHECK | SPECIAL LIQUID |
|---|---|---|---|
| Percent Protein | 16% | 15% | 15% |
| Number of Pigs | 22 | 23 | 22 |
| Average Purchase Weight | 42.3 | 41.6 | 41.4 |
| Average Finish Weight | 238.3 | 220 | 237 |
| Gain in Weight | 196 | 178.4 | 195.6 |
| Pounds of Feed Used/Hog | 635 | 605 | 590 |
| Pounds of Feed/Pounds of Gain | 3.240 | 3.391 | 3.016 |

The average initial weight of pigs in the control group was 42.3 pounds. The average weight of the protein control group was 41.6 pounds, and the average weight of the pigs receiving the supplement of the present invention was 41.4 pounds. The average finished weight of the control pigs was 238.3 pounds. The average weight of the protein control pigs was 220 pounds and the average weight of pigs receiving the supplement of the present invention was 237 pounds. The control pigs and the pigs receiving the formulation of the present invention had almost the same gain in weight. However, the control pigs were fed 635 pounds of food per hog while pigs receiving the formulation of the present invention were fed only 590 pounds of food per hog. Thus, significantly less food was required to obtain pigs having the same weight as or more weight than the control group of pigs. Pigs on the protein control diet showed a gain in weight of only 178.4 pounds but were fed at a rate of 605 pounds per hog. The results show that the feed supplement of the present invention, rather than mere addition of protein to a conventional animals' diet, improved efficiency of meat production as compared to food intake for the animals studied.

EXAMPLE TWO

A second test of swine compared the metabolic performance of pigs fed a control diet to pigs fed the food supplement of the present invention. The control diet was a producer's normal ration. The diet that included the feed supplement of the present invention had 100 lbs. less soybean meal (44% by weight) per ton of feed, and 50 lbs. more corn per ton of feed than the producer's normal ration. The diet included 50 lbs. of the liquid feed supplement of the present invention per ton of feed. The number of pigs in each group was 5. The average starting weight in each group was 68 pounds. The market weight gain for the control group was 232 pounds as can be seen in Table 3. The market weight gain for the group fed the diet of the present invention was 233 pounds. The total weight gain for the control group was 820 pounds and for the group fed the diet of the present invention was 825 pounds. To achieve this weight gain, the control group was fed 3,225 pounds of feed while the group fed the diet of the present invention was fed only 2,900 pounds of feed. This amounts to 3.93 pounds of feed per pound of gain for the control group and 3.51 pounds of feed per pound of gain for the group fed the formulation of the present invention. Thus, the group ingesting the feed supplement of the present invention utilized 10.08% less feed to achieve the same final market weight.

TABLE 3

|  | Control | Special Liquid |
| --- | --- | --- |
| Number of Pigs | 5 | 5 |
| Average Starting Weight | 68 | 68 |
| Average Market Weight | 232 | 233 |
| Total Gain | 820 | 825 |
| Total Pounds of Feed Used | 3,225 | 2,900 |
| Lbs. of Feed/Lbs. of Gain | 3.93 | 3.51 |

EXAMPLE THREE

One other test performed determined the quality and quantity of usable meat actually produced by pigs fed the food supplement of the present invention and control pigs. Three groups were tested that included a control group, a group fed a first formulation of the present invention, and a group fed a second formulation of the present invention. The control diet included a producer's normal ration with 17% protein by weight. The first formulation differed from the control diet by having a protein content of 16.2% protein. Also, the first formulation contained 50 lbs. less of a 48% soybean meal component per ton of feed than the control diet and 25 lbs. more corn per ton of feed than the control diet. The first formulation additionally contained 25 lbs. of the liquid feed supplement of the present invention per ton of feed.

The second formulation included a protein content of 16.6% by weight. Also, the second formulation contained 50 lbs. less of a 48% soybean meal component per ton of feed than the control diet. The second formulation included 50 lbs. of the liquid feed supplement of the present invention per ton of feed.

The number of pigs in each group was 4 pigs. The average initial weight per pig was 52 pounds. The age of each pig was about eight weeks. The pigs had been wormed and sprayed prior to the beginning of the study. The pigs had not received any vaccinations. The pigs were assigned to a pen of 18 square feet.

All groups were fed lysine and probiotics. Soymeal was replaced with the supplement of the present invention as described in Example Two and corn was fed to the pigs receiving the food supplement of the present invention as well as the control pigs.

The performance of the pigs is shown in Table 4. The live weight of the control pigs was 245 pounds. The live weight of pigs fed a first formulation of the present invention was 240 pounds, and pigs fed a second formulation of the present invention was 235 pounds. The first formulation included a concentration of the liquid feed supplement that was about one-half of the quantity of the second formulation.

When the pigs were butchered, it was found that the dressed weight of the control pigs was 165.5 pounds, the dressed weight of pigs fed the first formulation of the present invention was 166 pounds, and the weight was 165.5 pounds for pigs fed the second formulation of the present invention. A quantity of 78.47% of the control group weight was salable meat. A quantity of 80.02% of the weight of pigs fed the first formulation of the present invention was salable. A quantity of 82.22% of the weight of pigs fed the second formulation of the present invention was salable.

TABLE 4

|  | CONTROL | SPECIAL LIQUID #1 | SPECIAL LIQUID #2 |
| --- | --- | --- | --- |
| Live Weight | 245 lbs. | 240 lbs. | 235 lbs. |
| Dressed Weight | 165.5 lbs. | 166 lbs. | 165.5 lbs. |
| Yield | 67.5% | 69.0% | 70.4% |
| Salable Meat Production | 78.47% | 80.02% | 82.22% |
| Lard | 14.33% | 12.39% | 11.58% |
| Shrinkage | 7.20% | 7.59% | 6.20% |

The control group contained lard in a percentage of 14.33% by dressed weight. The percent lard in the pigs receiving the formulation of the present invention was significantly lower at 12.39% for the first formulation, and 11.58% for the second formulation. As can be seen in Table 4, the formulations of the present invention improved efficiency of metabolism of pigs by reducing lard formation and increasing salable meat formation.

A BUN (blood urea nitrogen) test was also performed on the blood of pigs tested while the pigs were still alive. A normal range for a BUN test for swine is 16–20 mg/dl. The control group of pigs had blood levels that fell within this range, having a range of 16–18 mg/dl. The group of pigs fed the first formulation of the present invention had a BUN 10–11 mg/dl while the second group had a BUN of 14–15 mg/dl. These test results were significantly lower than levels in the control swine group.

Cholesterol levels were also tested in blood of animals in the three groups. A normal range of cholesterol for swine is in the range of 80–120 mg/dl. The control group in the test conducted had blood cholesterol values within a range of 100–106 mg/dl, within the normal range. The group receiving the first formulation of the present invention had a significantly lower cholesterol levels of 93–99 mg/dl. The group receiving the second formulation of the present invention had a cholesterol levels within a range of 90–91 mg/dl. Thus, the food supplement of the present invention reduced cholesterol levels in the blood of the swine tested. This corresponds with the significantly lower lard concentrations found in the hogs receiving the food supplement of the present invention.

EXAMPLE FIVE

A group of control laying hens and a group of hens receiving the food supplement of the present invention were studied for a period of about three months. The control hens were fed a producer's normal ration. The hens receiving the feed supplement were fed a diet that differed from the producer's normal ration in that the diet had 100 lbs. less soybean meal per ton of feed, 25 lbs. less fat per ton, 75 lbs. more corn per ton and 50 lbs. of the liquid feed supplement of the present invention per ton. The hens were 21 weeks old at the beginning of the test. About 22.0 pounds of feed per 100 hens were fed to the hens receiving the food supplement of the present invention and about 21.8 pounds of feed per 100 hens were fed to the control hens. This is shown in Table 5, over the time period of the test. The egg laying performance of each of the groups is shown in Table 5. The laying percent refers to the percent of hens laying eggs during the course of the week. As can be seen, for the first two weeks, a greater percentage of control hens laid eggs each week than the hens receiving the feed of the present invention.

However, during and after the third week, a greater percentage of hens receiving the food supplement of present invention laid eggs than control eggs. The average percent of hens laying eggs and receiving the food supplement of the present invention over the course of the test period was 80.47% while the average number of control hens laying eggs was only 79.34%. Thus, the food supplement of the present invention surprisingly increased the laying percent of hens.

TABLE 5

Laying Hen Test
1-20-95 to 3-24-95

|  | Special Liquid Laying Percentage/week | Controls Laying Percentage/Week |
|---|---|---|
| Week 21 | 27.68 | 28.43 |
| 22 | 58.75 | 59.24 |
| 23 | 81.10 | 79.24 |
| 24 | 87.97 | 86.39 |
| 25 | 91.73 | 89.73 |
| 26 | 90.08 | 88.89 |
| 27 | 91.23 | 90.14 |
| 28 | 93.00 | 91.45 |
| 29 | 92.25 | 90.20 |
| 30 | 90.95 | 89.48 |
| Average | 80.47% | 79.34% |
| Lbs. Feed/100 Hens | 21.96 Pounds | 21.80 Pounds |
| Change in Ratio/Ton |  |  |
| −100 lbs. Soymeal/Ton of Feed |  | 10.00 |
| −25 lbs. Fat/Ton of Feed |  | 4.50 |

TABLE 5-continued

Laying Hen Test
1-20-95 to 3-24-95

|  | Special Liquid Laying Percentage/week | Controls Laying Percentage/Week |
|---|---|---|
| +50 lbs. Spec. Liq./Ton of Feed | 7.50 |  |
| +75 lbs. Corn/Ton of Feed | 3.75 |  |

It was found that the optimum formulation for egg production included a weight percent of 190 proof ethanol of 9%. It was observed that a higher ethanol content was adverse to egg production, because the higher ethanol contact diminished the appetites of the birds.

Eggs were tested for shell hardness, taste and color. Testing showed that the eggs laid by hens receiving the food supplement of the present invention were comparable to eggs produced by the control hens.

EXAMPLE SIX

In a hen laying test, two groups of hens were tested for 40 weeks. One of hens received the feed supplement of the present invention and the second was a control group. The diets were the same as described for Example Five. The results are shown in Table 6. The results show the percent of hens laying eggs each week. For weeks 1–14, the special hens, hens receiving the feed supplement of the present invention, consumed 22.7 pounds of feed per 100 hens. The control hens ate 23.36 pounds of feed per 100 hens. An average of 66.16% of the hens receiving the food of the present invention laid eggs while the control hens had a laying average of 66.07%.

TABLE 6

Laying Hen Test
Mar. 21, 1994 to Dec. 19, 1994
Hens were just coming out of molt

| Week | Special Liquid Laying %/Week | Controls Laying %/Week |
|---|---|---|
| 1 | 17.33 | 15.55 |
| 2 | 34.20 | 36.76 |
| 3 | 45.55 | 44.02 |
| 4 | 52.47 | 50.23 |
| 5 | 57.80 | 57.34 |
| 6 | 71.31 | 69.31 |
| 7 | 76.07 | 71.05 |
| 8 | 77.73 | 81.82 |
| 9 | 80.04 | 82.81 |
| 10 | 82.02 | 82.93 |
| 11 | 82.81 | 83.10 |
| 12 | 83.17 | 83.48 |
| 13 | 83.00 | 83.45 |
| 14 | 82.70 | 82.69 |
| 15 | 62.31 | 81.40 |
| 16 | 71.09 | 81.15 |
| 17 | 76.87 | 82.01 |
| 18 | 80.25 | 81.84 |
| 19 | 79.78 | 80.02 |
| 20 | 78.47 | 78.77 |
| 21 | 78.68 | 79.34 |
| 22 | 78.28 | 79.20 |
| 23 | 78.34 | 79.22 |
| 24 | 77.76 | 79.77 |
| 25 | 77.24 | 79.73 |
| 26 | 74.51 | 78.71 |
| 27 | 74.80 | 76.24 |
| 28 | 73.01 | 74.53 |

TABLE 6-continued

Laying Hen Test
Mar. 21, 1994 to Dec. 19, 1994
Hens were just coming out of molt

| Week | Special Liquid Laying %/Week | Controls Laying %/Week |
|---|---|---|
| 29 | 73.52 | 74.59 |
| 30 | 72.83 | 74.25 |
| 31 | 72.50 | 70.57 |
| 32 | 72.43 | 70.03 |
| 33 | 71.07 | 71.02 |
| 34 | 71.18 | 68.55 |
| 35 | 70.15 | 69.17 |
| 36 | 70.19 | 68.30 |
| 37 | 69.95 | 68.34 |
| 38 | 70.19 | 67.73 |
| 39 | 70.42 | 67.42 |
| 40 | 69.40 | 48.53 |

As can be seen, in weeks 15–26, the laying average of the hens consuming the food supplement of the present invention was actually a little worse than the laying average of the control hens. This was because these hens received a higher alcohol content in their feed ration than the 9% by weight of the feed supplement. It was observed that this higher alcohol content negatively influenced the laying behavior of the hens.

For weeks 27–40, the original food supplement of the present invention with 9% alcohol by weight was utilized. At week 26, water problems were encountered in the pens containing the hens receiving the food supplement of the present invention. These hens had no water for 24 hours. Despite this setback, the hens receiving the food supplement of the present invention had a percent laying over this interval of 71.53% compared to 69.33% for the control group. These hens consumed 23.04 pounds as compared to 25.53 pounds for the control group. At week 41, the production of eggs by the control group was so low that the producer butchered the hens. The hens receiving the liquid supplement of the present invention did not show a similar drop in production as is evidenced by week 40 production results.

Eggs were tested for shell hardness, taste and color. The testing showed that the eggs from hens receiving the formulation of the present invention were comparable to control eggs.

A summary of egg laying performance for pullets and hens is shown in Table 7. As can be seen, a greater percentage of pullets consistently laid eggs that were fed the feed supplement of the present invention as compared to pullets receiving the control feed. The pullets receiving the feed of the present invention also had an increased egg production despite a lower ratio of pounds of feed per dozen eggs. These results were also observed for laying hens consuming the feed supplement of the present invention and for laying hens consuming a control diet. Hens designated "B" and "D" in Table 7 were regular laying hens. Hens designated "C" were older laying hens.

Twelve pullets and twelve control birds were used to generate the data shown in Table 7. Overall, 78% of the control birds laid eggs while 82% of the pullets laid eggs. If extrapolated to 80,000 birds, this amounted to total eggs of 62,400 for the control group and 65,600 for the pullets.

The results were even more dramatic for laying hens. Results as shown in Table 8 were averaged for 80,000 birds. About 71% of the control hens laid eggs while about 76.4% of the hens receiving the feed supplement of the present invention laid eggs. Extrapolating to 80,000 birds, the control hens laid 56,800 eggs while the hens receiving the feed supplement of the present invention laid 61,120 eggs.

TABLE 7

Laying Test

| Pullets | Lbs. Feed Per Dozen Eggs | Percent Laid | Average Weight Per Egg (Ounces) |
|---|---|---|---|
| 50–100 A-1 | 3.636 | 82.00 | 2.11 |
| Control A-2 | 3.587 | 79.00 | 2.19 |
| 50-50 A-3 | 3.349 | 86.00 | 2.14 |
| 50–150 BA | 3.788 | 78.00 | 2.20 |
| Control B-5 | 3.731 | 77.00 | 2.12 |
| Totals: | | | |
| Test | 3.591 | 82.00 | 2.15 |
| Control | 3.659 | 78.00 | 2.16 |
| Hens | | | |
| 50–150 B-6 | 3.437 | 80.00 | 2.27 |
| 50–150 C-7 | 4.375 | 67.00 | 2.32 |
| 50–100 C-8 | 4.011 | 72.00 | 2.31 |
| Control C-9 | 4.619 | 68.00 | 2.42 |
| 50–100 D-10 | 3.801 | 80.00 | 2.27 |
| Control D-11 | 3.821 | 74.00 | 2.43 |
| 50-50 D-12 | 3.677 | 83.00 | 2.30 |
| Totals: | | | |
| Test | 3.860 | 76.40 | 2.29 |
| Control | 4.220 | 71.00 | 2.43 |

| | # Birds | Percent Laid | Total Eggs | # Eggs per Day in Dozens |
|---|---|---|---|---|
| Pullets | | | | |
| Test | 80,000 | 82.00 | 65,600 | 5,466.67 |
| Control | 80,000 | 78.00 | 62,400 | 5,200.00 |
| | | Daily | | Annually |
| Gain in lbs. of Eggs | | 3,200 | | 1,168,000 |
| Gain in Dozens | | 267 | | 97,455 |
| Hens | | | | |
| Test | 80,000.00 | 76.40 | 61120 | 5093.33 |
| Control | 80,000 | 71.00 | 56800 | 4733.33 |
| | | Daily | | Annually |
| Gain in lbs. of Eggs | | 4,320 | | 1,576,800 |
| Gain in Dozens | | 360 | | 131,400 |

Broilers were also tested for weight gain considered with respect to amount of feed consumed by the broilers. Results of a series of tests are shown in Table 8. The control broilers were fed a diet of a producer's normal ration. The test diet differed from the producer's normal ration by having 100 lbs. less of a 44% soybean meal component per ton of feed, 50 lbs. more corn and 50 lbs. of the liquid feed supplement of the present invention per ton of feed. As is shown in Table 8, the protein percentage in the feed rations ranged from 16.7% in the feed supplement of test 2 to 19% in the control feed of test 1.

The hens receiving the feed supplement of the present invention consistently produced more meat than the control hens. This increased quantity of meat occurred even though the hens receiving the feed supplement of the present invention utilized fewer pounds of feed per pound of weight gain. Table 8 illustrates that the meat production in broilers, like the meat production in swine, is enhanced significantly in animals receiving the feed supplement of the present invention as compared to control animals. Further, the use of the animal supplement reduced ammonia present in the broiler house as well as the swine pen and enhanced flavor and taste of broiler meat as well as pork. The broilers and swine had a reduced fat content as compared to broilers and swine not fed the animal supplement of the present invention.

The tests of broilers showed that use of the animal supplement increased the amount of weight gained per pounds of feed consumed. Similarly to swine, the consumption of the animal supplement by broilers also produced more pounds of salable meat per broiler. Further, the use of the animal supplement reduced ammonia present in the broiler house and enhanced flavor and taste of broiler meat. The broilers had a reduced fat content as compared to broilers not fed the animal supplement of the present invention.

A test of the feed supplement of the present invention on a dairy cow herd showed an increase in milk production. The test herd produced an increased quantity of milk of seven pounds of milk per day per cow in just the first week of the test. In a second test, milk production increased by two pounds per cow over a three day period. Further, the cows consuming the feed supplement of the present invention also consumed less grain and more roughage than the control cows.

It is also contemplated that one other feed supplement embodiment may be used to feed ruminant animals. In this embodiment, the ruminant feed supplement includes 190 proof ethanol in a concentration of 9% by weight of the supplement. The 190 proof ethanol is made from an ethyl alcohol ingredient that is 95.2% by weight and that is denatured with 4.8% ethyl acetate. The feed supplement also includes a mixture of urea-phosphorus-oxygen in a ratio of 10-34-0 in a concentration 3.75% of the supplement. The formulation additionally includes 100% urea in a concentration of 10.3% and bentonite clay in a concentration of 0.5%. The formulation further includes condensed distiller's solubles in a concentration of 70.45% and 6% water. A breakdown of ingredients in the condensed distiller's solubles are shown in Table 9 and are obtained from a process converting biomass to ethanol.

TABLE 9

Condensed Distiller's Solubles

| | |
|---|---|
| Crude Protein | 24.0% |
| Available Protein | 21.0% |
| Acid Detergent Fiber | 12.0% |
| Neutral Detergent Fiber | 13.0% |
| Total Fatty Acids | 19.0% |
| Phosphorus | 1.3% |
| Potassium | 1.6% |
| Calcium | 0.3% |
| Sulfur | 0.4% |
| Magnesium | 6.0% |
| Iron | 400 ppm |
| Copper | 5 ppm |
| Manganese | 35 ppm |
| Zinc | 100 ppm |
| Sodium | 6000 ppm |

A test of the condensed distiller solubles embodiment of the feed supplement of the present invention was performed on a dairy cow herd. The test showed an increased in milk production of 7 lbs. of milk per day per cow consuming the feed supplement as compared to a control group of cows. The control group of cows consumed a normal producer's ration.

In a second test, one group of cows was fed the first embodiment of the liquid feed supplement, without the condensed distiller's solubles, with molasses. A second group of cows was fed the condensed distiller's solubles embodiment of the present invention. In this test, milk production increased by 2 lbs. per cow per day over a three-day period for the cows receiving the feed supplement with the condensed distiller solubles as compared to cows receiving the feed supplement free of the condensed distiller solubles.

Feeding the supplement of the present invention, containing both ethanol and condensed distiller's solubles to cows increased both energy and fiber in a bovine diet. Meeting the energy requirements of the animals without using excessive amounts of grain, thereby increasing the amount of fiber

TABLE 8

Broiler Test

| | Test #1 Control | Test #1 Supplement 50–100 | Test #2 Control | Test #2 Supplement 50–100 | Test #3 Control | Test #3 Supplement 50–100 | Test #4 Control | Test #4 Supplement 50–100 |
|---|---|---|---|---|---|---|---|---|
| Days of Production | 46 | 46 | 59 | 59 | 42 | 42 | 46 | 46 |
| Protein Percentage in Feed Ration | 19.00 | 17.70 | 18.00 | 16.70 | 18.00 | 17.60 | 18.30 | 17.00 |
| Number of Birds | 110 | 110 | 40 | 40 | 40 | 40 | 50 | 50 |
| Average Weight . . . Live (In Pounds) | 4.00 | 4.15 | 6.08 | 6.19 | 4.5 | 4.77 | 4.77 | 4.79 |
| Average Weight . . . Dressed (In Pounds) | 2.87 | 2.87 | 4.23 | 4.45 | 2.98 | 3.24 | 3.36 | 3.39 |
| Pounds feed used per pound of gain | 2.41 | 2.12 | 3.31 | 3.04 | 3.00 | 2.68 | 2.91 | 2.55 |
| Dressed Weight to Live Weight Percentage Extrapolation for 40,000 Birds | 69.83 | 69.16 | 69.57 | 71.89 | 66.22 | 67.92 | 70.44 | 70.77 |
| Total Pounds of Meat Produced | 114800 | 114800 | 169200 | 178000 | 119200 | 129600 | 134400 | 135600 |
| Additional Pounds of Meat Produced | | 0 | | 8800 | | 10400 | | 1200 | required, resulted in some positive results. It is believed that this type of diet enables the bovine to maximally utilize energy without unnecessary losses due to low fiber.

Although the present invention has been described with reference to preferred embodiments, workers skilled in the art will recognize that changes may be made in form and detail without departing from the spirit and scope of the invention.

What is claimed is:

1. A liquid supplement for feeding to bovine animals, consisting of ethyl alcohol in a concentration of about 9% by weight of the supplement, condensed distiller solubles obtained from a process converting biomass to ethanol, wherein the concentration of the condensed distiller solubles is about 70.45% by weight of the liquid supplement, clay, urea, water, and optionally ethyl acetate, phosphorus, whey, molasses, soybean oil in concentrations that bring the total concentration to 100%.

2. A method for increasing milk production in ruminant animals without increasing the dietary grain quantity ingested by ruminant animals, the method comprising;

providing an animal feed supplement consisting of ethyl alcohol in a concentration of about 9% by weight of the supplement, condensed distiller solubles obtained from a process converting biomass to ethanol, wherein the concentration of the condensed distillers solubles is about 70.45% by weight of the animal feed supplement, clay, urea, water, and optionally ethyl acetate, phosphorus, whey, molasses, soybean oil in concentration that bring the total concentration to 100 percent; and feeding the feed supplement to a ruminant animal wherein the feed supplement is fed to the animal in a quantity effective to meet the animal's energy requirement without requiring the animal to consume grain in excess of grain fed without the feed supplement and wherein milk production is increased as compared to milk production of ruminant animals not receiving the animal feed supplement or receiving a supplement that consists of ethanol, only.

3. The method of claiom 2 wherein the feed supplement is fed to the animal in a quantity effective to meet the animal's energy requirement without requiring the animal to consume grain in excess of grain fed without the feed supplement.

4. The method of claim 2 wherein the supplement is fed as a liquid.

5. The method of claim 2 wherein the supplement is fed in a lick tank.

6. The method of claim 2 wherein the supplement is blended in the ruminant's ration.

* * * * *